United States Patent [19]
Sridhar

[11] Patent Number: 5,702,221
[45] Date of Patent: Dec. 30, 1997

[54] MATERIALS HANDLING SYSTEM

[75] Inventor: Sidney Sridhar, Richmond, Canada

[73] Assignee: Seabulk Systems Inc., Richmond, Canada

[21] Appl. No.: 759,931

[22] Filed: Dec. 4, 1996

Related U.S. Application Data

[63] Continuation of Ser. No. 414,027, Mar. 31, 1995, abandoned.

[51] Int. Cl.$^6$ ............................................. B63B 27/22
[52] U.S. Cl. ........................ 414/142.3; 198/532; 222/559
[58] Field of Search ............................. 198/531, 532; 222/545, 559, 561; 414/142.3, 306

[56] References Cited

U.S. PATENT DOCUMENTS

| | | | |
|---|---|---|---|
| 2,505,982 | 5/1950 | Meissner | 414/142.3 |
| 2,815,134 | 12/1957 | Borrowdale | 414/142.3 X |
| 3,191,998 | 6/1965 | Howleh | 414/142.3 X |
| 4,428,504 | 1/1984 | Bassett et al. | 222/545 X |
| 4,828,448 | 5/1989 | Skeath | 414/304 |

*Primary Examiner*—Janice L. Krizek
*Attorney, Agent, or Firm*—Elbie R. de Kock

[57] ABSTRACT

A materials handling system for controlling the gravity discharge of material through a discharge opening 33 onto a conveyor 34 comprises a gate 40 extending across the discharge opening 33 and having at least one but preferably a plurality of outlet openings 40.4 therein for the through flow of material from the discharge opening and a feeder deck 60 below the gate 40 having a surface for receiving material discharged from the discharge opening 33 through the gate 40. The feeder deck surface is movable transversely of the discharge opening 33 for controlling the flow of material through the gate 40 and for discharging the material onto the conveyor 34. The materials handling system can be employed for controlling the gravity discharge of material from a plurality of in-line domes 100 or from a plurality of holds 112 of a self-unloading ship 110.

15 Claims, 20 Drawing Sheets

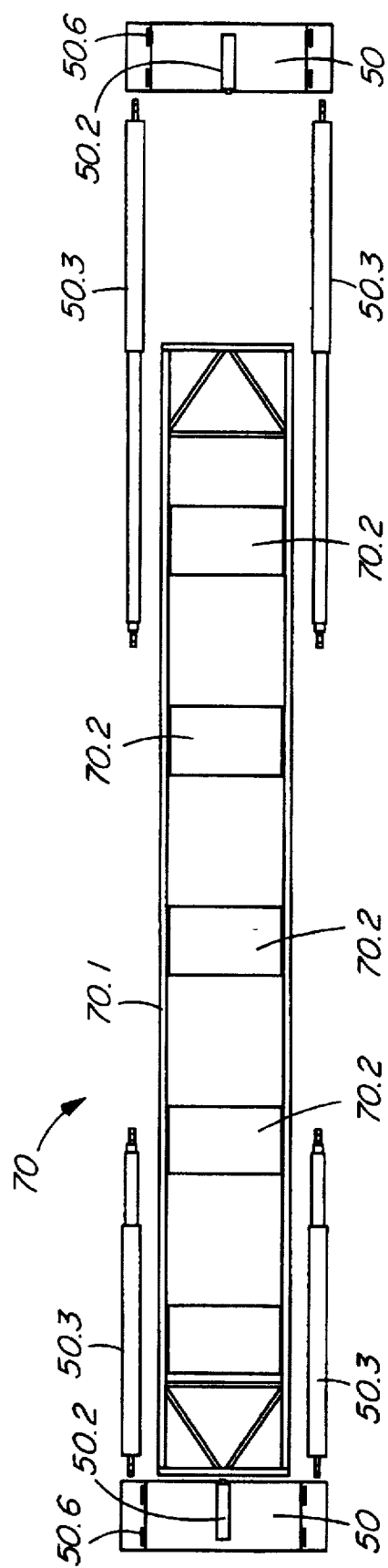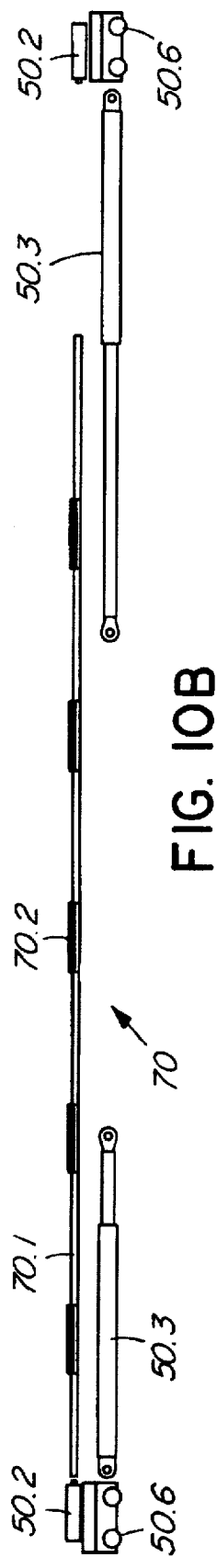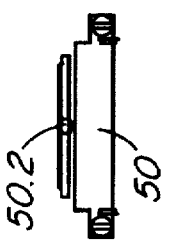
FIG. 10A
FIG. 10B
FIG. 10C

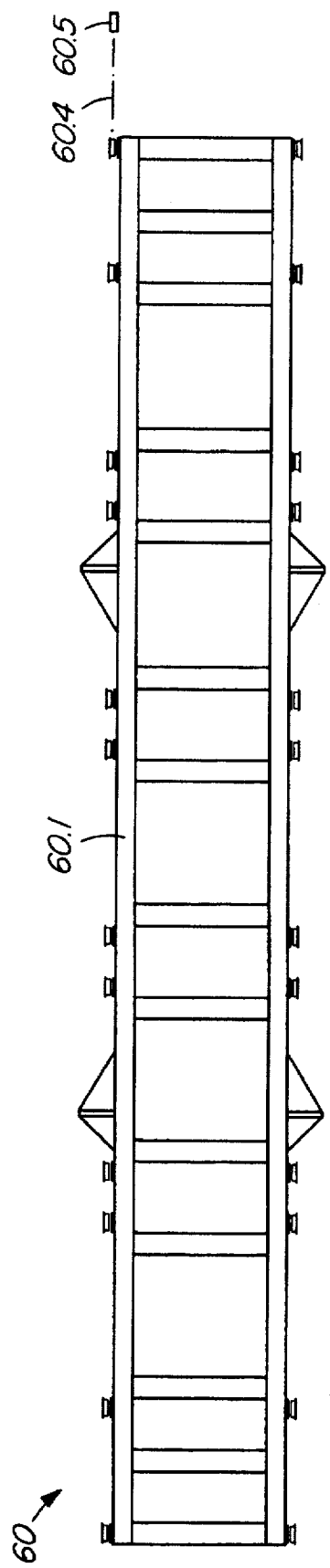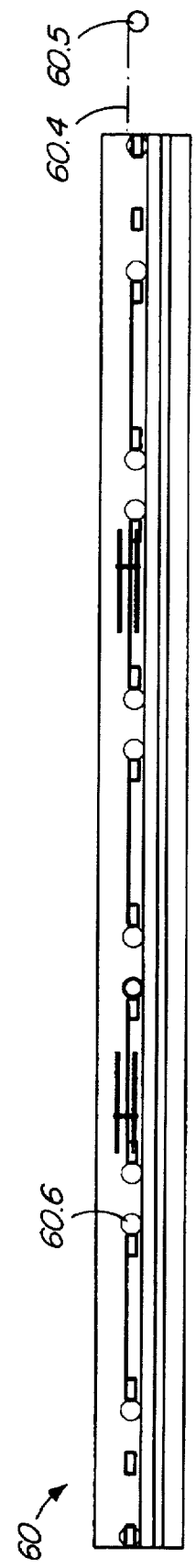
FIG. 11A
FIG. 11B

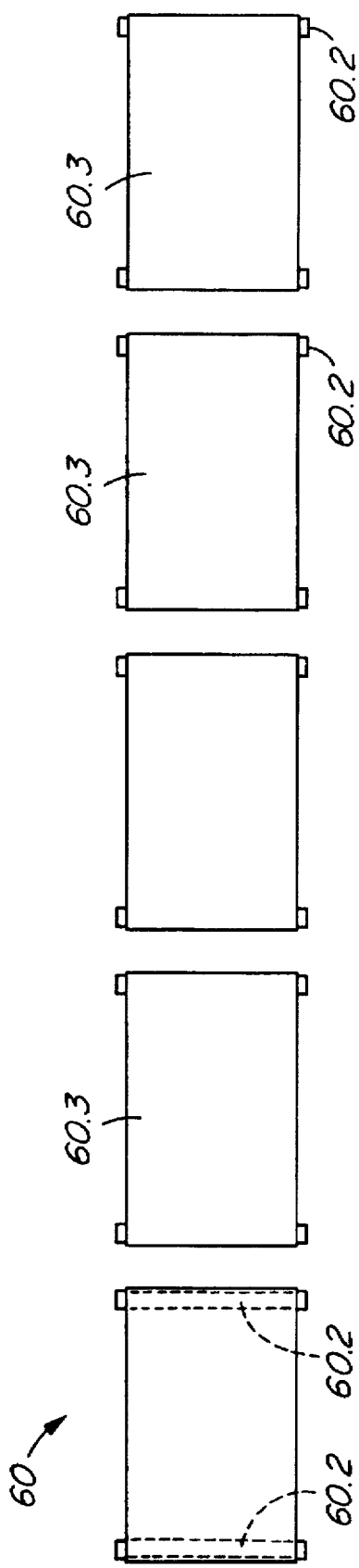
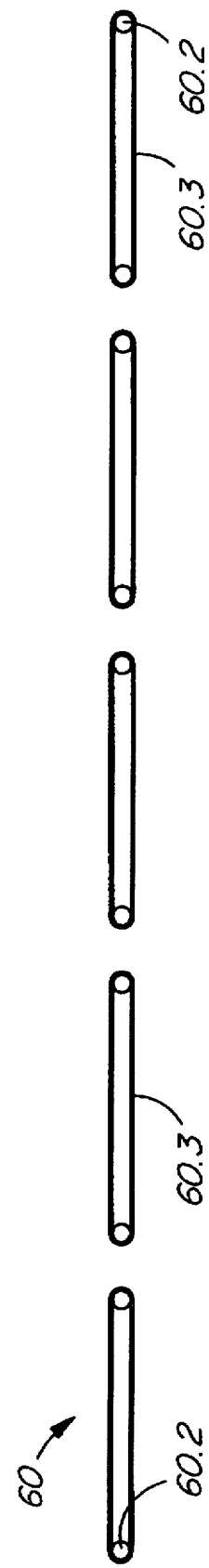
FIG. 12A
FIG. 12B

MATERIALS HANDLING SYSTEM

This application is a continuation of U.S. patent application Ser. No. 08/414,027, filed Mar. 31, 1995, now abandoned, the contents of each of the aforementioned applications being incorporated herein by reference.

FIELD OF THE INVENTION

This invention relates to a materials handling system. In particular, it relates to a system which can be used in conjunction with a tunnel conveyor for the discharge of bulk materials stored in in-line storage hoppers or in open stockpiles.

BACKGROUND OF THE INVENTION

Storage hoppers are provided with gates for the discharge of material therefrom, normally onto a conveyor belt located below the hopper. In a typical installation, a plurality of in-line hoppers are provided with a conveyor belt running along a tunnel beneath the hoppers. Such a tunnel conveyor then transports the material discharged from the hoppers to a desired location.

Most gates are installed in hoppers by using hog backs in order to narrow the opening to a controllable size, typically 4 ft×4 ft. These are fixed gates which are opened and closed manually to permit material discharge onto the belt conveyor. Hang up of material is very common and vibrators must be used to relieve plugged materials.

The gates do not permit accurate metering or control of discharge rates. This results in material surges and flooding of the conveyor belts and considerable dust emission.

It is accordingly an object of the present invention to alleviate the above-mentioned difficulties.

SUMMARY OF THE INVENTION

According to the invention, there is provided a materials handling system for controlling the gravity discharge of material through a discharge opening onto a conveyor, which discharge opening has a width dimension in the horizontal direction, the system comprising a gate extending across said discharge opening and having at least one outlet opening, of a smaller dimension than said discharge opening, therein for the through flow of material from the discharge opening through the gate; a feeder deck below the gate having a surface for receiving material discharged from the discharge opening through the gate, said feeder deck surface being movable transversely of said discharge opening for controlling the flow of material through said gate and for discharging the material onto said conveyor.

The gate may be movable transversely of the discharge opening for relocating the outlet opening of the gate along the width of the discharge opening. The gate may have a plurality of the outlet openings therein for the through flow of material.

The materials handling system may be employed for controlling the gravity discharge of material through a plurality of laterally spaced discharge openings, comprising a gate for each discharge opening, the feeder deck being selectively movable between the discharge openings and further comprising a power source for moving the feeder deck between the discharge openings.

The invention also extends to a multi-dome or other storage installation incorporating a material handling system as described above. The invention further extends to a self-unloading ship incorporating a materials handling system as described.

Further objects and advantages of the invention will become apparent from the description of a preferred embodiment of the invention below.

BRIEF DESCRIPTION OF THE DRAWINGS

FIGS. 10A, 10B and 10C are plan, side and end views, respectively, of a tractor and gate closure plates of the system of FIG. 1;

FIGS. 11A and 11B are plan and side views, respectively, of a movable deck of the system of FIG. 1;

FIGS. 12A and 12B are plan and side views, respectively, of a plurality of endless belts which are associated with the movable deck of FIGS. 11A and 11B;

DETAILED DESCRIPTION OF PREFERRED EMBODIMENT

Figure 1:
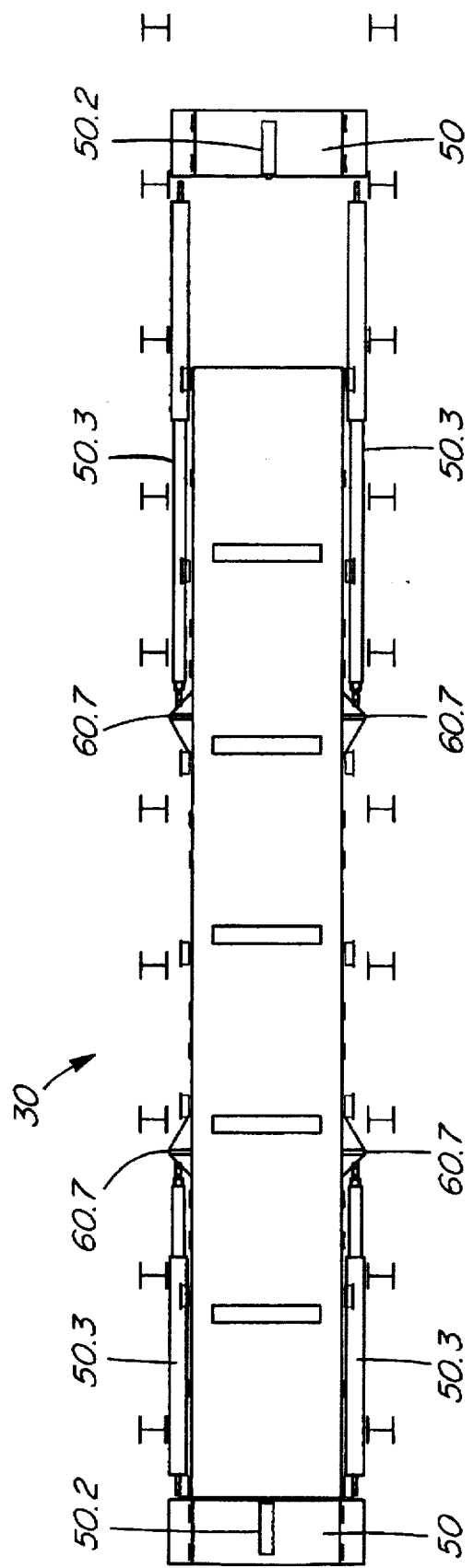
FIG. 1 is a plan view of a materials handling system according to the invention.
Figure 2:
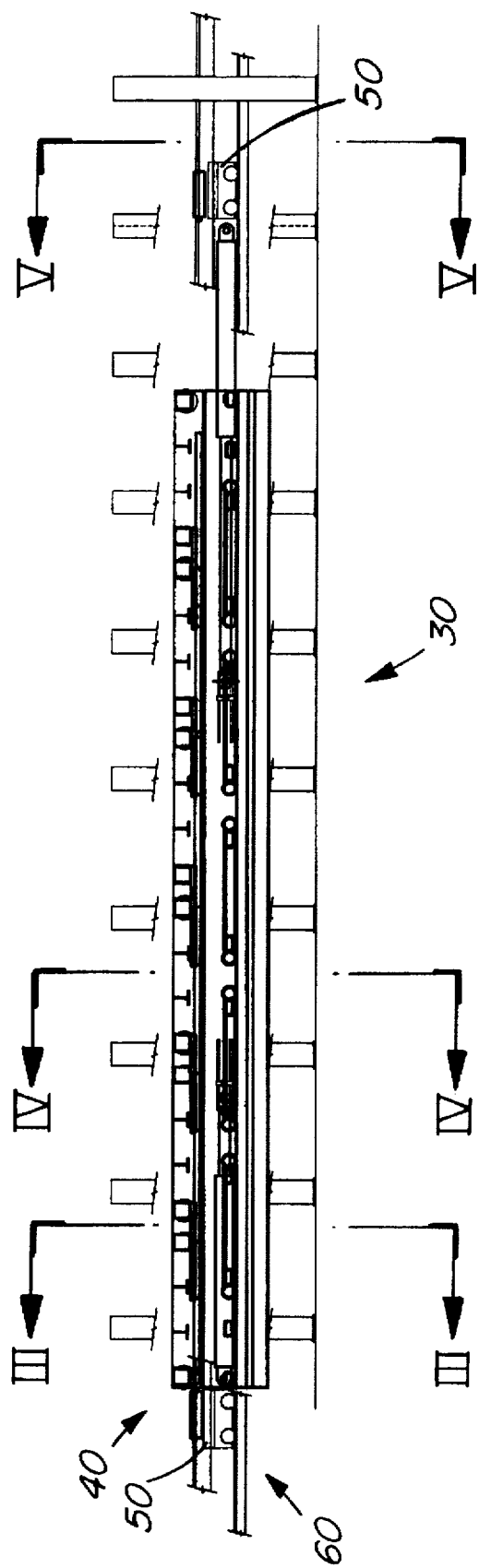
FIG. 2 is a side view of the system of FIG. 1.
Figure 3:
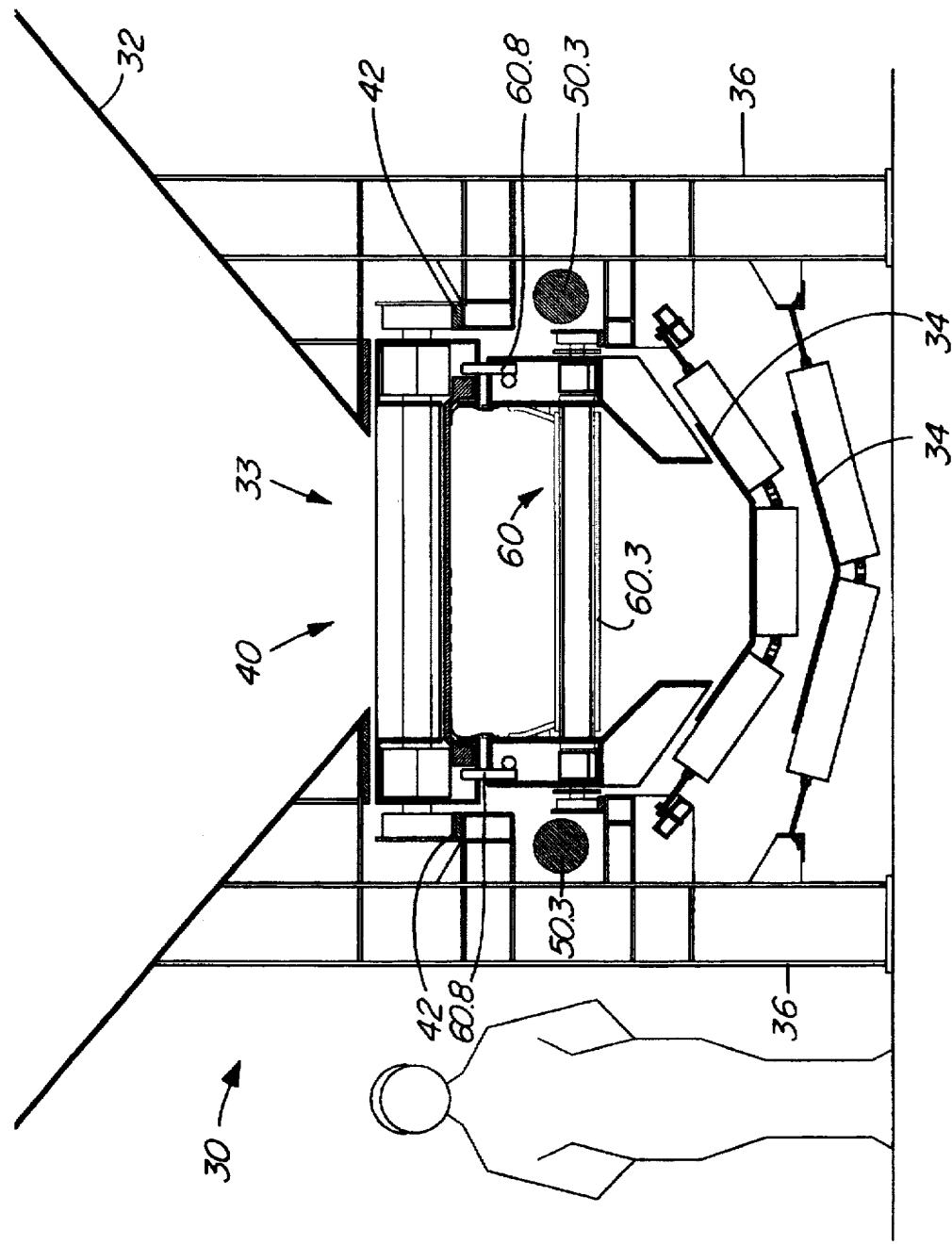
FIG. 3 is a section taken along the lines III—III in FIG. 2.
Figure 4:
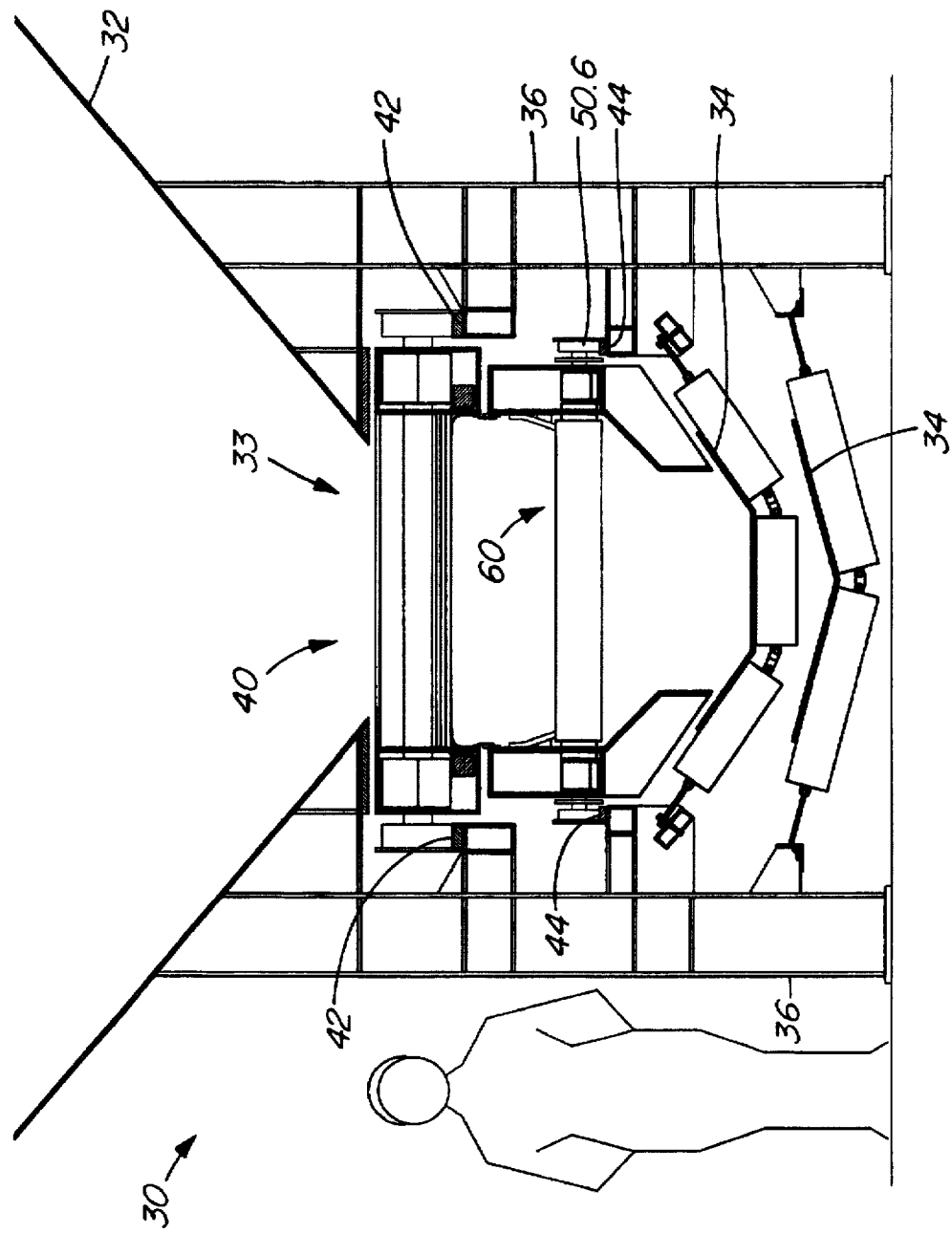
FIG. 4 is a section taken along the lines IV—IV in FIG. 2.
Figure 5:
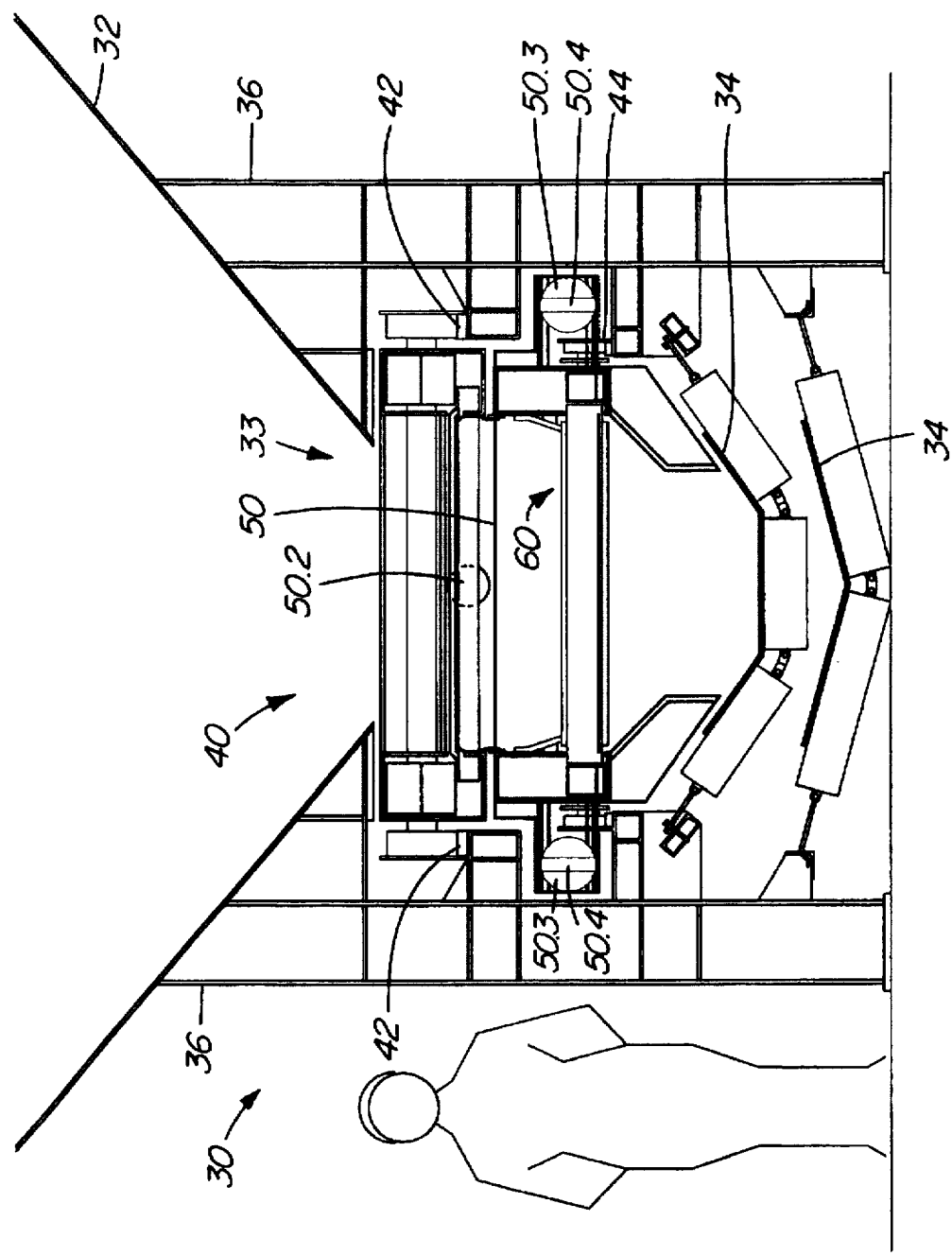
FIG. 5 is a section taken along the lines V—V in FIG. 2.
Figure 6:
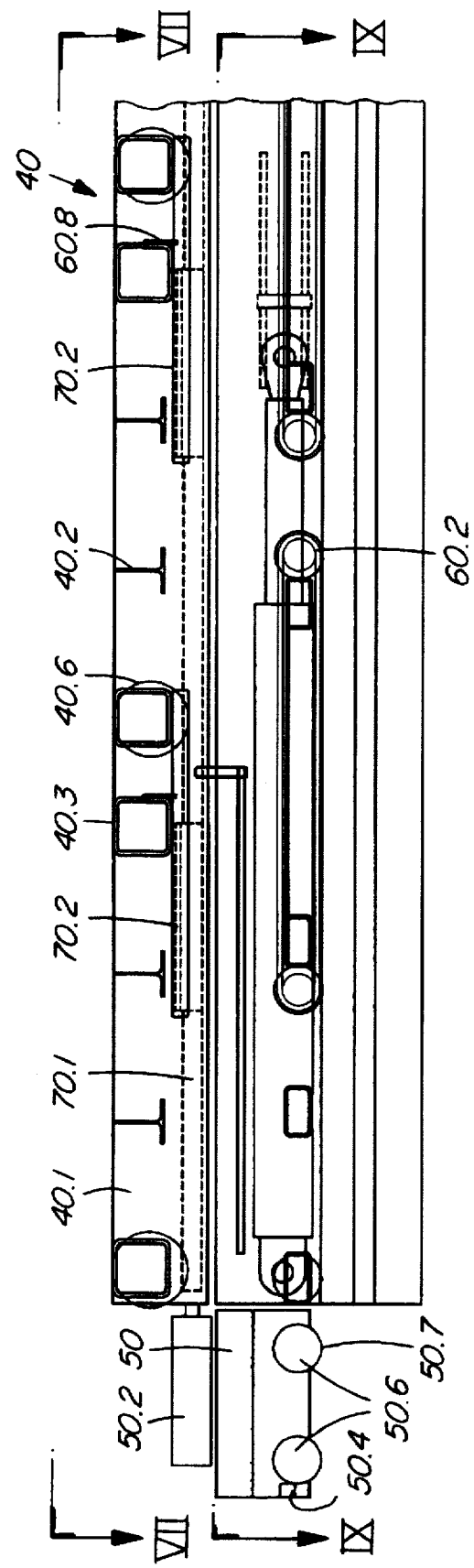
FIG. 6 is an enlarged view of the portion included in the rectangle in FIG. 2.
Figure 7:
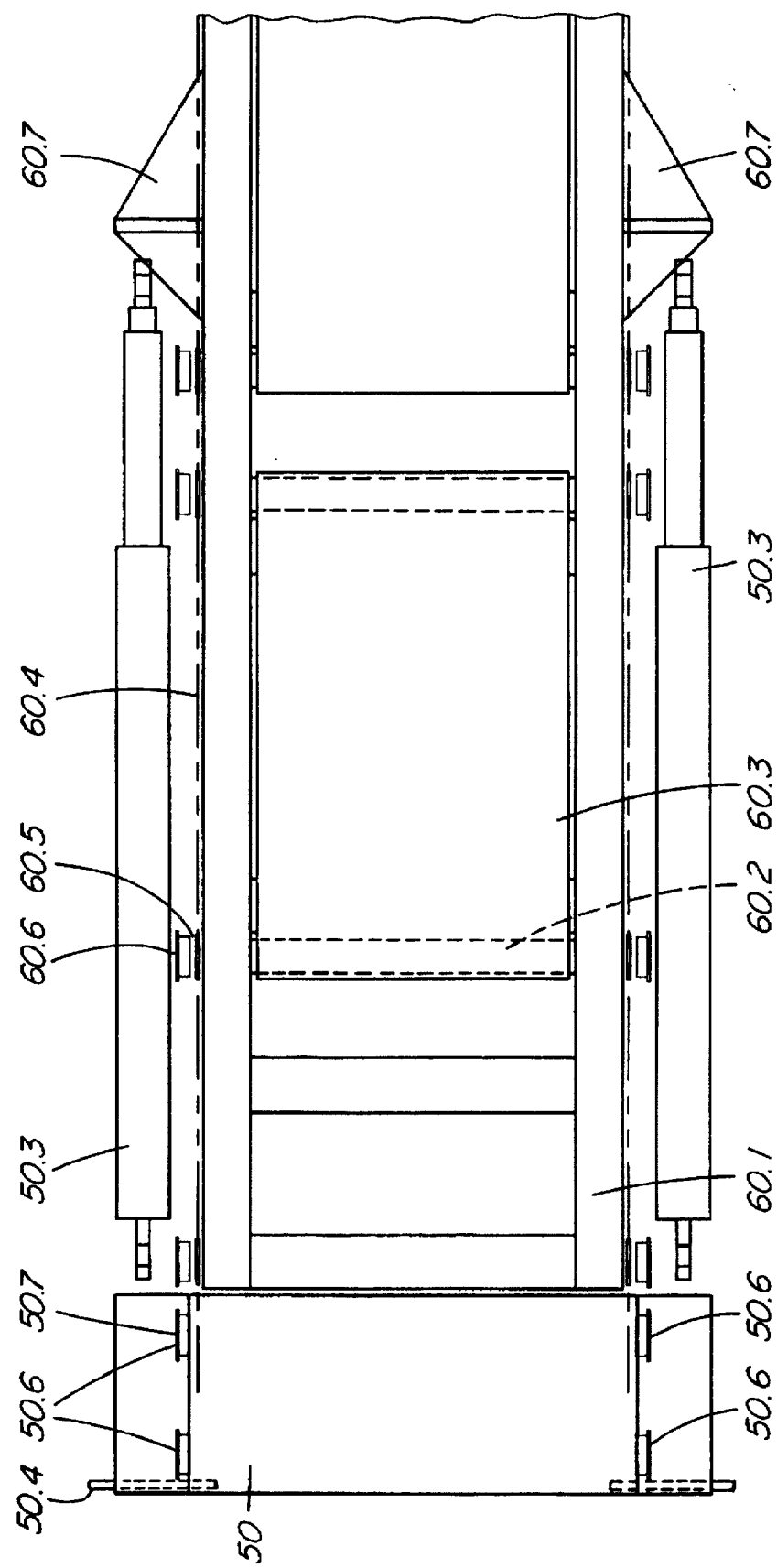
FIG. 7 is a view taken along the lines VII—VII in FIG. 6.
Figure 8:
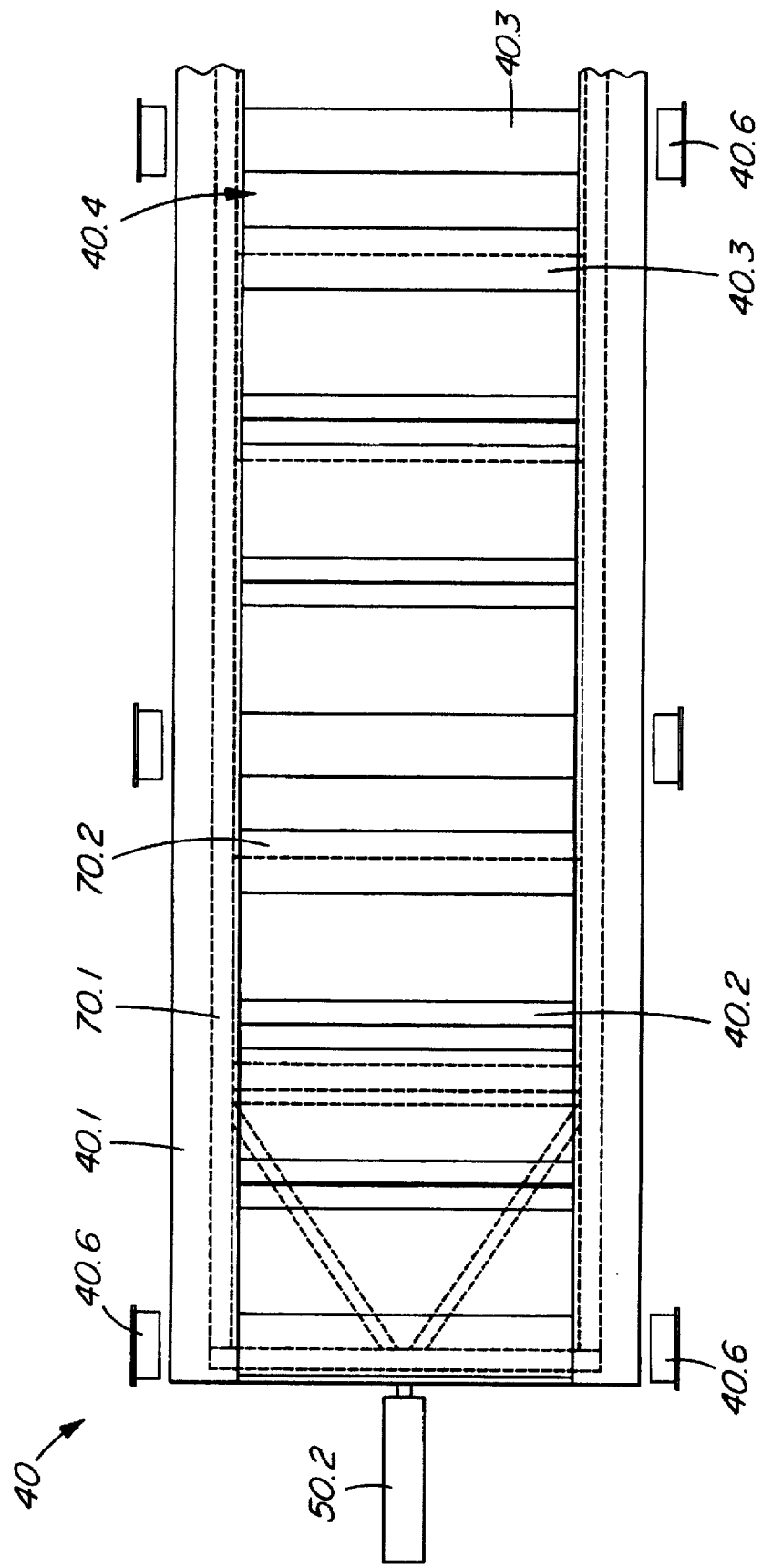
FIG. 8 is a section taken along the lines VIII—VIII in FIG. 6.
Figure 9A:
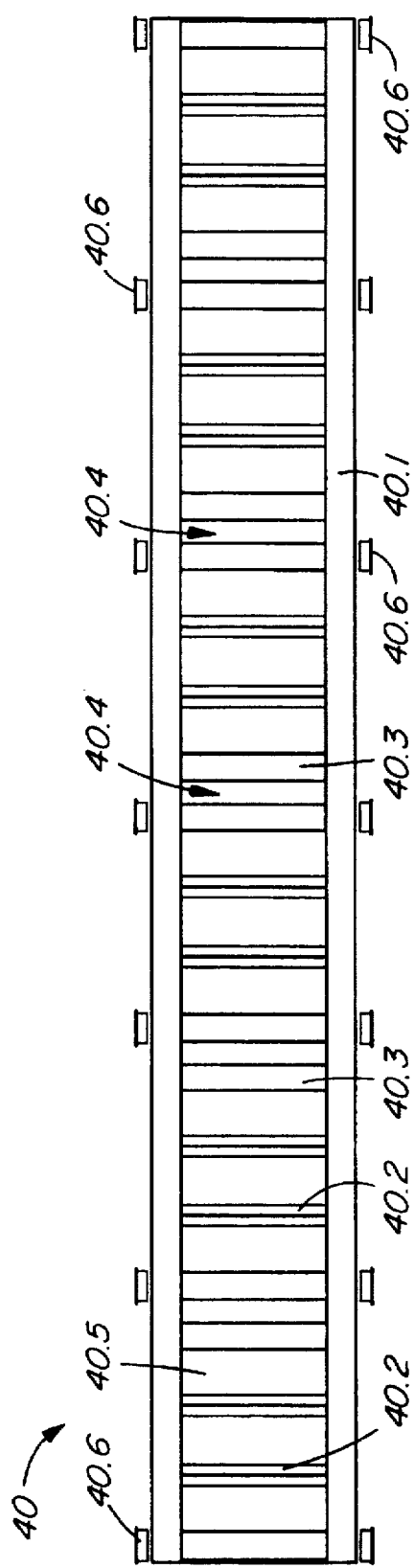
FIGS. 9A, 9B and 9C are plan, side and end views, respectively, of a gate of the materials handling system of FIG. 1.
Figure 9B:
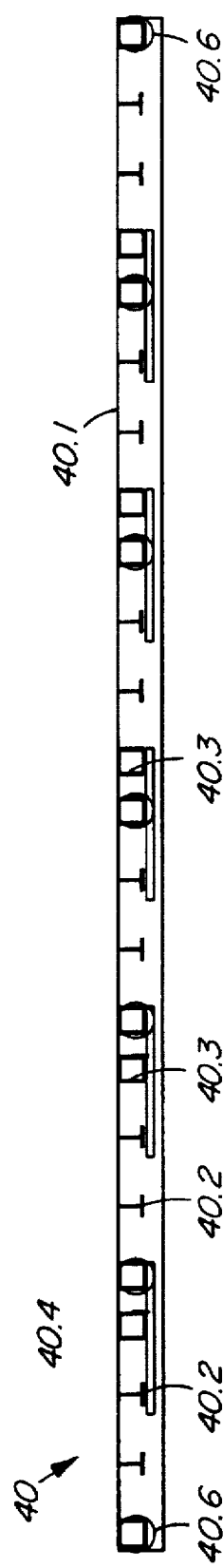
Figure 9C:
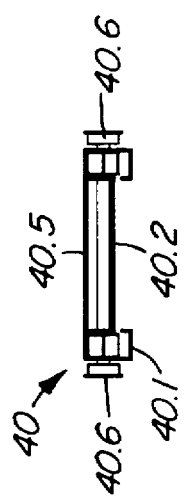

Referring first to FIGS. 1–12, reference numeral 30 generally indicates a materials handling system. The system 30 can be used in conjunction with a plurality of in-line storage hoppers (only one hopper 32 being shown in FIGS. 3 to 5) and beneath which hoppers a tunnel conveyor belt 34 extends for conveying the material discharged from the hoppers 32. Each hopper 32 has a discharge opening 33 at its lower end. The hoppers 32 are supported on columns 36.

The system 30 comprises a gate 40 for each storage hopper 32, a pair of opposing tractors 50 for travel from one gate 40 to another and a feeder deck 60, connected to the tractors 50 for travel therewith.

The gate 40 comprises an elongate framework 40.1 which is supported below the hopper 32 on a track 42. The framework 40.1 is provided with transverse stiffening members 40.2 and a number of pairs of transverse members 40.3 defining a series of gate openings or slots 40.4 therebetween. Plates 40.5 are provided on the framework 40.1 to cover the framework 40.1, leaving only the gate openings 40.4 unobscured. The gate 40 has a plurality of wheels 40.6 for running along the track 42. The gate 40 is movable in its longitudinal direction relative to the gate discharge opening 33. In this way, the location of the gate openings 40.4 can be moved along the hopper discharge opening 33 to counteract hang up of material in the hopper 32, as will be described below. The movement of the gate 40 in either direction is effected by the tractors 50 through hydraulic cylinders 50.3 which are operative between the tractors 50 and the feeder deck 60, as will be described in more detail below.

As can be seen from FIG. 1, two hydraulic cylinders 50.3 are associated with each tractor 50. The hydraulic cylinders 50.3 are connected to the tractor 50 at one end, while their opposite ends are connected to brackets 60.7 provided on the deck 60.

Each tractor 50 has four wheels 50.6, two of which are driven and which run along a second track 44 located below the track 42. The track 44 runs along the lower ends of the hoppers 32 so that the tractors 50 can travel to each hopper 32. Each tractor 50 is further provided with a hydraulic actuator 50.2.

The tractors 50 are provided with locking pins 50.4 which engage with the columns 36 for locking a tractor 50 in position relative to a hopper 32 when moving the gate 40 by means of the hydraulic cylinders 50.3.

The feeder deck 60 comprises an elongate framework 60.1 to which is mounted a number of pairs of spaced rollers 60.2 with an endless belt 60.3 around each pair of rollers 60.2. A pair of rollers 60.2 and belt 60.3 are provided for each of the gate openings 40.4. The pairs of rollers 60.2 are connected together through an endless drive chain 60.4 on sprockets 60.5. The deck 60 has wheels 60.6 which run on the lower track 44 along with the tractors 50.

A driven sprocket 50.7 is provided on one tractor wheel 50.6, which sprocket 50.7 is lined up with the other chain sprockets 60.5, for driving the chain 60.4.

The deck 60 is provided with a pair of locking pins 60.8 for locking the deck 60 to the gate 40 when the tractors 50 are locked to the columns by means of the locking pins 50.4. When the tractors 50 and deck 60 are locked in position by the pins 50.4 and 60.8, the hydraulic power of the cylinders 50.3 can be utilized to move the gate 40, as will be described below.

A closure plate assembly 70 is provided for each gate 40 and is located beneath the gate 40. The assembly 70 comprises an elongate frame 70.1 on which is mounted a set of closure plates 70.2 equal to the number of gate openings 40.4. The plates 70.2 are spaced along the length of the frame 70.1 and cooperate with the gate openings 40.4. The frame 70.1 is capable of longitudinal movement relative to the gate 40 for opening and closing the openings 40.4.

Material which is stored in a hopper 32 is kept inside the hopper 32 by the gate 40 with the closure plates 70.2 in a closed position, thus sealing off the openings 40.4 in the gate 40.

When material from a hopper 32 is to be discharged, the tractors 50 and the associated feeder deck 60 are moved to the hopper 32. This is achieved by activating the driven wheels 50.6 on the tractor 50 by a hydraulic motor (not shown) which is located on the tractor 50. When the tractor 50 is in position, the feeder deck belts 60.3 are located below the hopper gate 40 and the tractors 50 and deck 60 are locked in position by means of the locking pins 50.4 and 60.8. The locking of the tractor 50 provides a fixed position for the operation of the hydraulic cylinders 50.3. The drive which is used to power the driven wheels 50.6 is also used to drive the chain sprockets 50.7 for rotation of the belts 60.3.

The flow of material from the hopper 32 is controlled by the gate 40. The closure plates 70.2 are opened by the joint action of the actuator 50.2 and the hydraulic cylinders 50.3 on one of the tractors 50. This is achieved by extending the actuator 50.2 towards the closure plate framework 70.1 and pulling the gate 40 towards the actuator using the hydraulic cylinders 50.3. When the actuator 50.2 comes into contact with the closure plate framework 70.1, the framework 70.1 is prevented from moving but the gate 40 continues to move, thus forcing the closure plates 70.2 to open. The extent of opening of the closure plates 70.2 can be controlled by adjusting the extended actuator length. To close the plates 70.2, the first actuator 50.2 is retracted and the hydraulic cylinders 50.3 and actuator 50.2 on the opposite tractor 50 are used.

With the plates 70.2 in the open position, material is discharged through the slots 40.4 onto the feeder belt 60.3 which in turn, due to their rotation, deliver the discharged material to the tunnel conveyor 34 for load out in the usual fashion. In operation, the area between the gate openings 40.4 and the feeder belts 60.3 will be filled with the material being discharged, thus, the rate of discharge of material through the gate 40 can be controlled or metered by controlling the speed of rotation of the belts 60.3.

In the event that material discharged from the hopper 32 seizes due to hang ups, the gate 40 is moved relative to the discharge opening 33 by means of the hydraulic cylinders 50.3 to shift the slots 40.4. The gate 40 and the feeder deck 60 are moved together due to the locking pins 60.8 which are operative for locking the gate 40 and the deck 60 together.

After the material has been discharged from the hopper 32, the pins 60.8, as well as the pins 50.4, are disengaged to release the tractors 50. The tractors 50 and deck 60 can then be moved to the next hopper 32 to be discharged.

Some applications of the system 30 will now be described with reference to FIGS. 13–20. Parts which correspond with parts shown in FIGS. 1–12 are given the same reference numerals.

Figure 13:
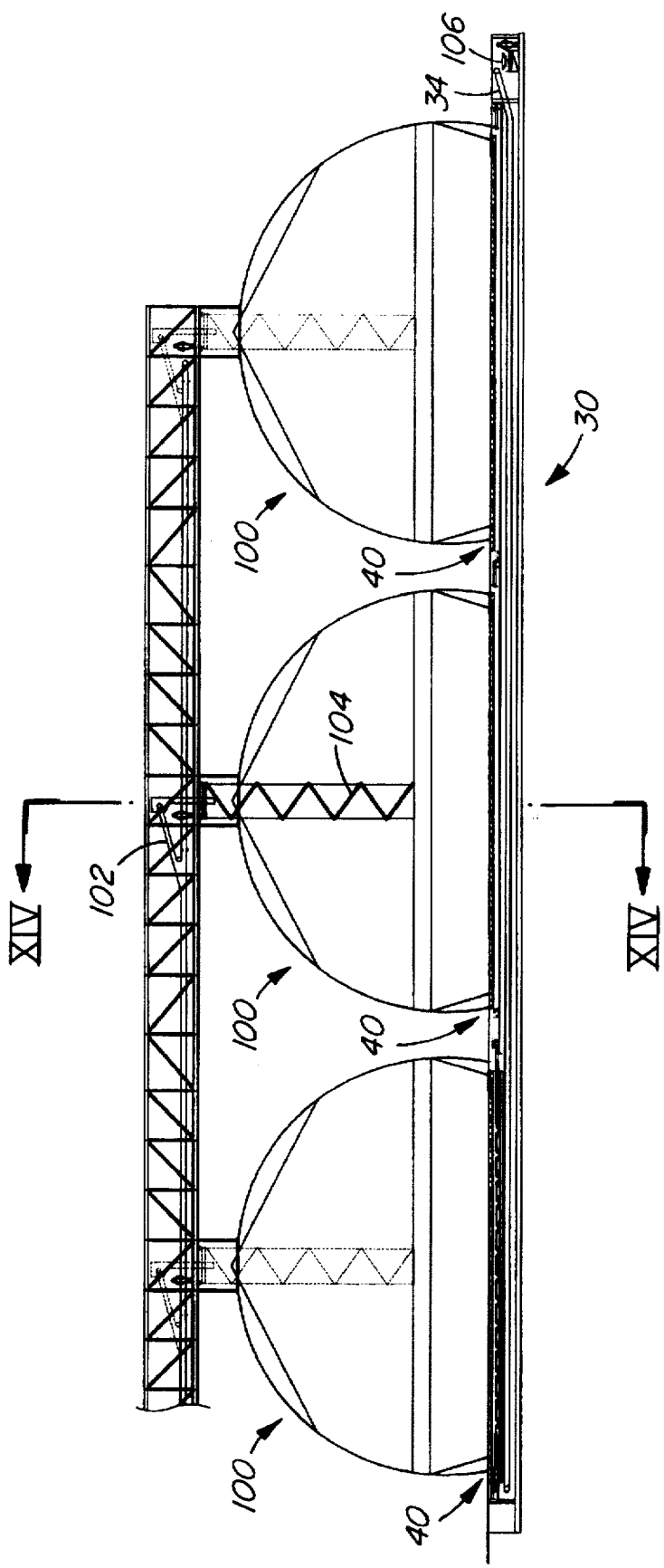
FIG. 13 is a side view showing an application of the materials handling system with multiple domes.
Figure 14:
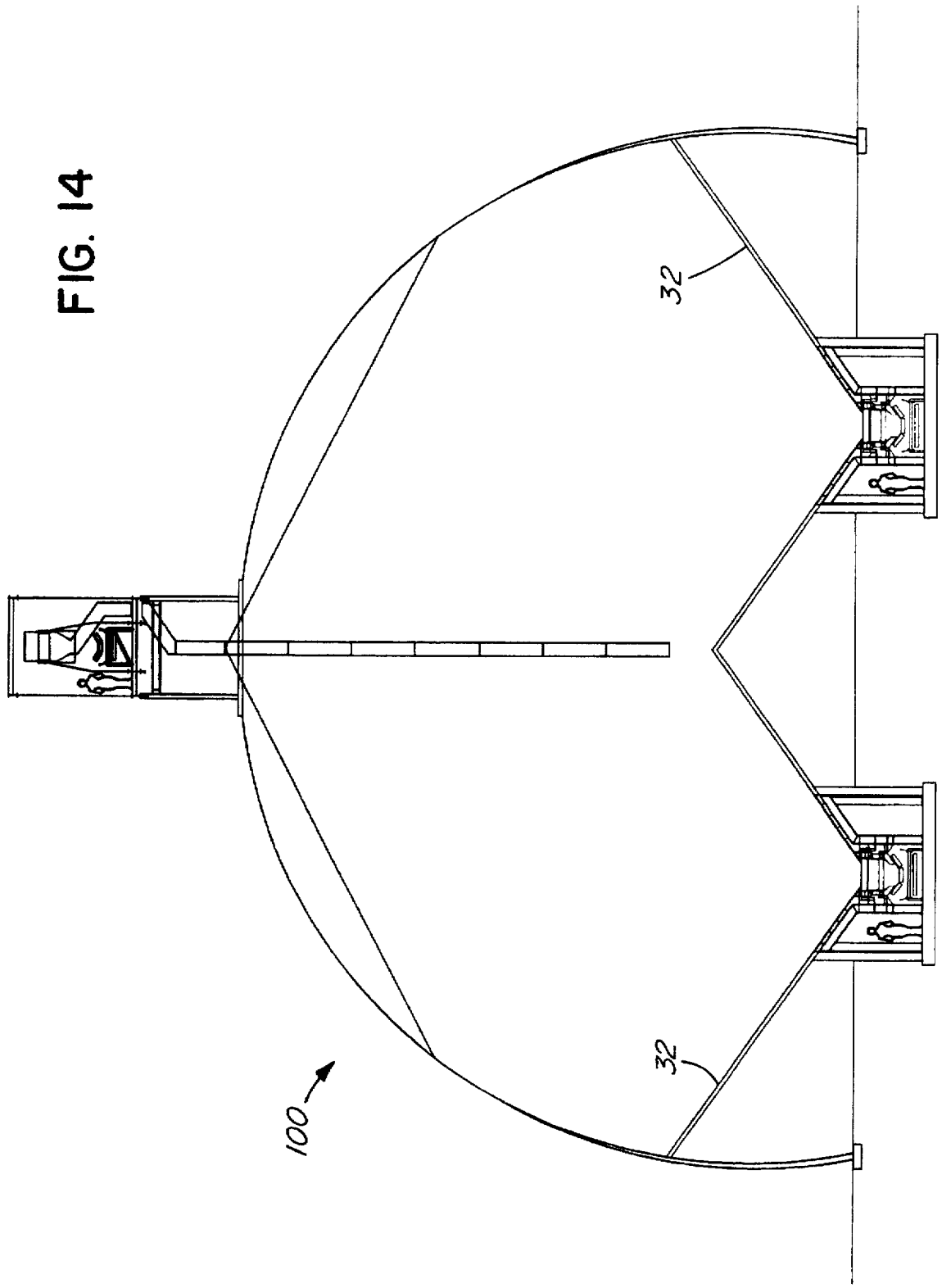
FIG. 14 is a section taken along the lines XIV—XIV in FIG. 13.
Figure 15:
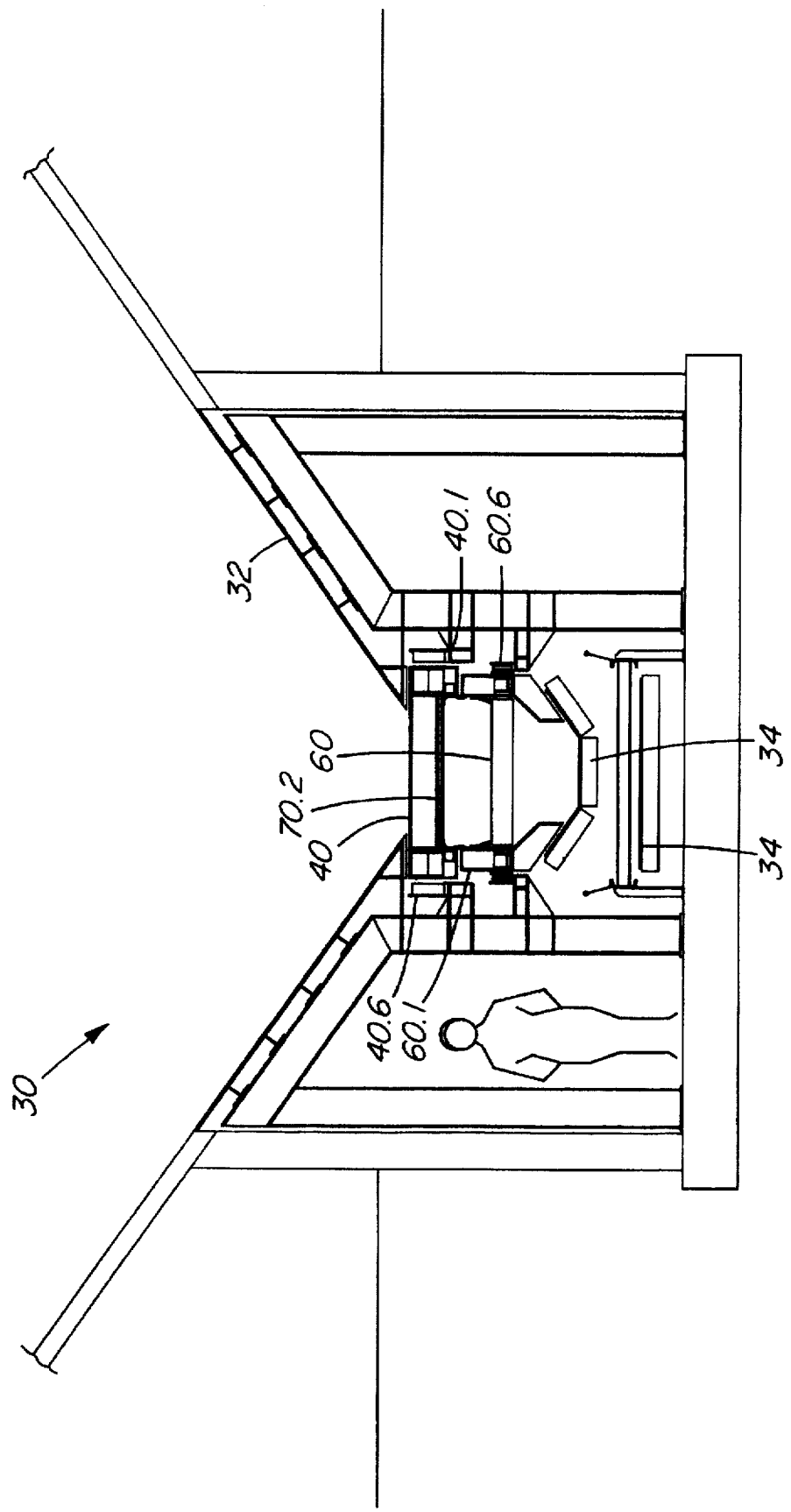
FIG. 15 is an enlarged view of the encircled portion of FIG. 14.
Figure 16:
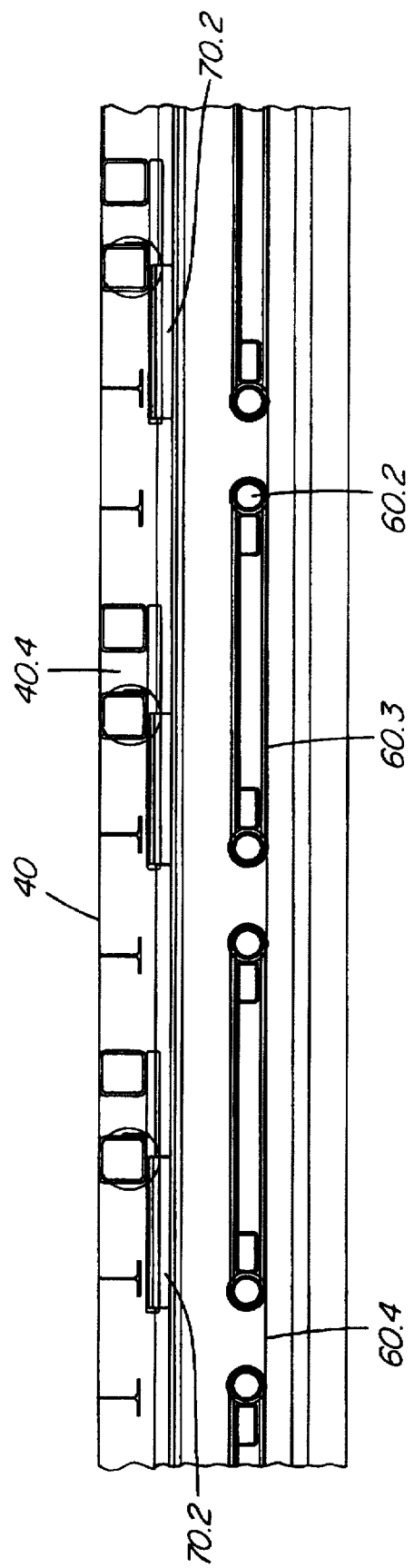
FIG. 16 is a partial side view showing details of some of the parts of the materials handling system of FIG. 13.

In FIGS. 13–16, a typical application with multiple in-line domes 100 is shown. As shown in FIG. 14, the lower part of each dome 100 is formed into two side-by-side hoppers 32. The system 30 is installed with respect to each of the hoppers 32, as shown for one of the hoppers 32 in FIG. 15. Thus, in this application, two of the systems 30 are located side by side, each provided with a respective tunnel conveyor 34.

In FIG. 13, reference numerals 102 and 104, respectively, indicate a tripper conveyor and a telescoping asymmetrical soft loading chute for loading materials into the domes 100. Reference numeral 106 indicates a transfer conveyor for receiving material from the tunnel conveyors 34.

The track 44 of each system 30 runs along the bottom of all the domes 100. Thus, by movement of the unit comprising the tractors 50 and the feeder deck 60 along the track 44 to the gate 40 of a required dome 100, material discharge from any one of the domes 100 can be effected as desired.

Figure 17:
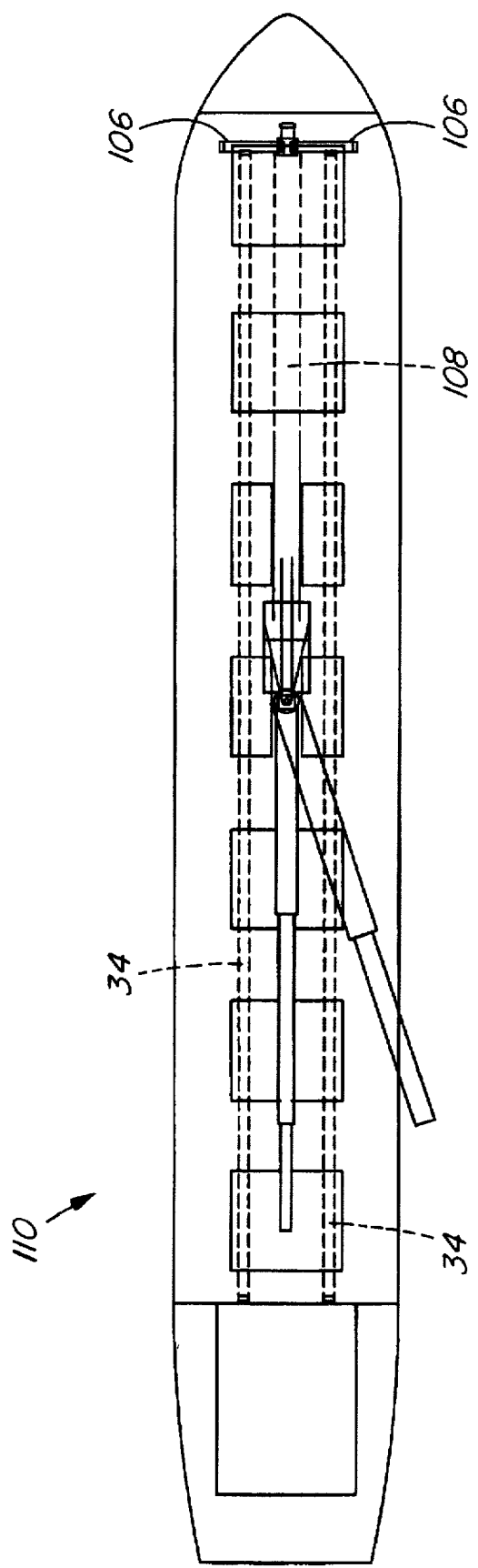
FIG. 17 is a plan view of a self-unloading ship provided with a materials handling system according to the invention.
Figure 18:
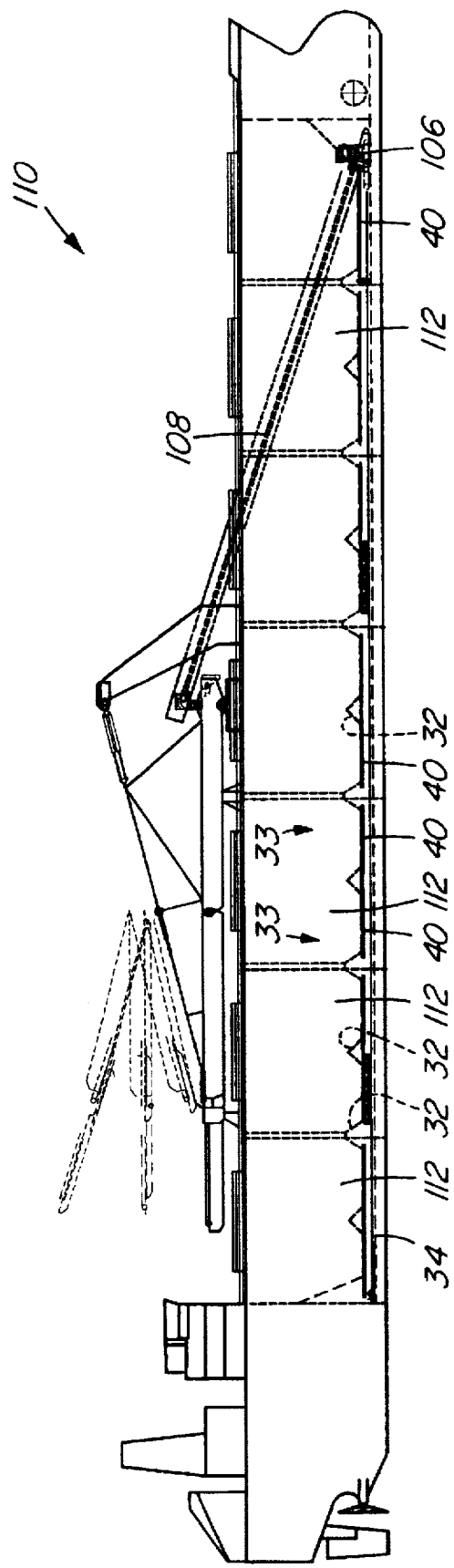
FIG. 18 is a side view of the ship of FIG. 17.
Figure 19:
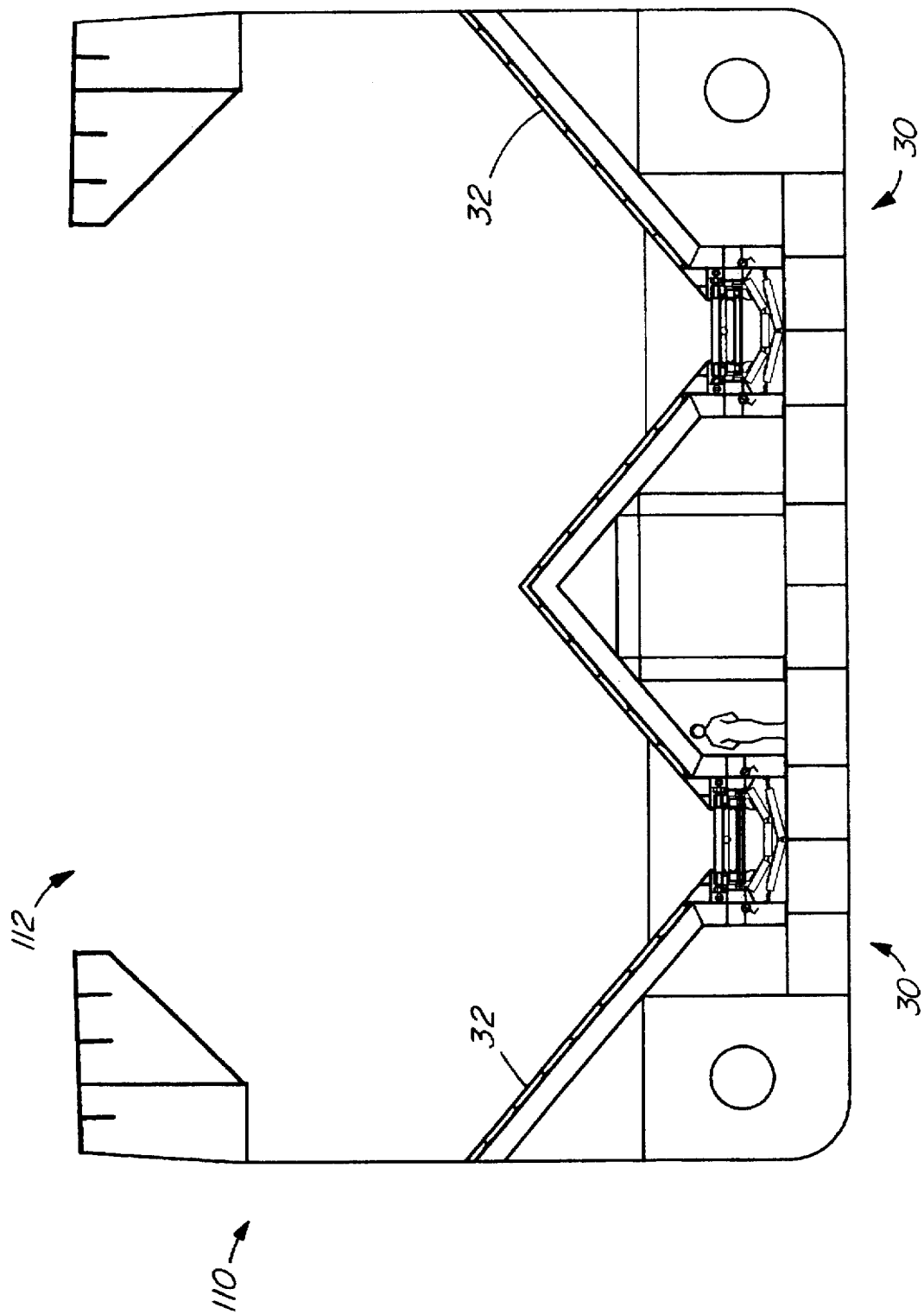
FIG. 19 is a cross-section through the hold of the ship of FIG. 17.
Figure 20:
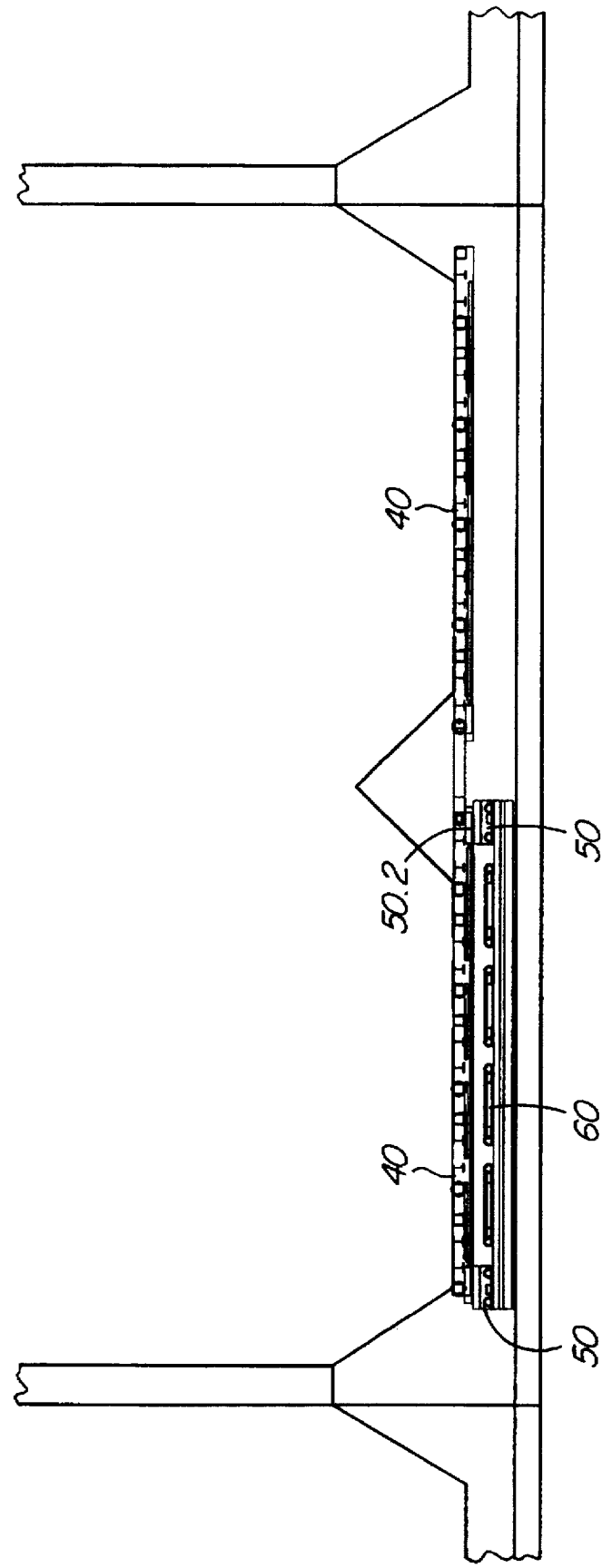
FIG. 20 is an enlarged view of the portion included in the rectangle in FIG. 18.

In FIGS. 17–20, an application of the system 30 in a self-unloading ship 110 is shown. The ship 110 has seven separate holds 112, the lower parts of which are shaped to form two side-by-side hoppers 32, as shown in FIG. 19. Thus, there are again two of the systems 30 installed side by side, as shown in FIG. 19. In addition, some of the holds 112 are shaped to form two hoppers 32 spaced longitudinally of the ship 110, as shown in FIG. 18. Thus, these holds 112 have a total of four discharge openings 33, each provided with a gate 40.

As can be seen in FIG. 17, there is one tunnel conveyor 34 on the starboard side of the ship 110 and one tunnel conveyor 34 on the port side. There is also a transfer conveyor 106 on the starboard side and a transfer conveyor 106 on the port side.

The track 44 of each system 30 runs along the length of the ship 110 past all the gates 40 of the holds 112. Thus, in this application again material from any one of the holds 112 can be discharged and unloaded by movement of the tractors 50 and feeder deck 60 to the gate 40 or one of the longitudinally spaced gates 40 of any one of the holds 112, as desired.

Reference numeral 108 refers to an incline conveyor which receives material from the transfer conveyors 106 for transporting the material to the outside for unloading purposes.

While only preferred embodiments of the invention have been described herein in detail, the invention is not limited thereby and modifications can be made within the scope of the attached claims.

What is claimed is:

1. A materials handling system for controlling the gravity discharge of material through a discharge opening onto a conveyor, which discharge opening has a width dimension in a horizontal direction, the system comprising:

a gate extending across said discharge opening and having at least one outlet opening, of a smaller dimension than said discharge opening, therein for the through flow of material from the discharge opening through the gate;

a feeder deck below the gate having a surface for receiving material discharged from the discharge opening through the gate, said feeder deck surface being mounted for translational movement transversely of said gate for controlling the flow of material through said gate and for discharging the material onto said conveyor.

2. The materials handling system of claim 1, wherein said gate is movable transversely of said discharge opening for relocating the outlet opening of the gate along the width of the discharge opening.

3. The materials handling system of claim 2, wherein the gate has a plurality of said outlet openings therein for the through flow of material.

4. The materials handling system of claim 1, for controlling the gravity discharge of material through a plurality of laterally spaced discharge openings, comprising one of said gates for each discharge opening, said feeder deck being selectively movable between said discharge openings and further comprising a power source for moving said feeder deck between said discharge openings.

5. The materials handling system of claim 4, further comprising a closure plate for each said outlet opening in each gate for opening and closing said outlet openings.

6. The materials handling system of claim 5, wherein said closure plates for each gate are located on a supporting framework located beneath the gate and movable relative to the gate.

7. The materials handling system of claim 4, wherein said power source comprises a wheeled unit running on a track extending between the discharge openings for movement of the power source from one discharge opening to another.

8. The materials handling system of claim 7, wherein the feeder deck is connected to the wheeled unit for movement along with the wheeled unit from one discharge opening to another.

9. The materials handling system of claim 8, wherein the wheeled unit is provided with a hydraulic cylinder which is selectively connectable to each one of said gates for effecting the movement of each gate relative to its respective discharge opening.

10. The materials handling system of claim 9, wherein an opposing pair of said wheeled units is provided for effecting movement of each gate in opposite directions.

11. The materials handling system according to claim 9, wherein said discharge openings are the discharge openings of a plurality of in-line hoppers.

12. The materials handling system according to claim 9, wherein said discharge openings are the discharge openings of a plurality of in-line holds on a self-unloading ship.

13. A self-unloading ship provided with a materials handling system according to claim 12.

14. The materials handling system of claim 9 wherein each of said gates has a plurality of said outlet openings therein for the throughflow of material.

15. The materials handling system of claim 14, wherein said feeder deck comprises an endless belt mounted for rotation about a pair of spaced rollers for each one of said plurality of gate outlet openings, said pairs of spaced rollers being interconnected by means of a chain drive, and including a drive sprocket on said wheeled unit for driving said chain drive.

* * * * *